United States Patent [19]
Aidala et al.

[11] 3,939,361
[45] Feb. 17, 1976

[54] ELECTRONIC TIMER SWITCH

[75] Inventors: Dwain Aidala, Marlboro; Albert W. Welz, Jr., Westford, both of Mass.

[73] Assignee: Arthur D. Little, Inc., Cambridge, Mass.

[22] Filed: May 9, 1974

[21] Appl. No.: 468,474

[52] U.S. Cl. ............... 307/141; 328/48; 328/129
[51] Int. Cl.² ............... H01H 7/00; H01H 43/00
[58] Field of Search ........ 307/141, 293; 328/48, 37, 328/129

[56] References Cited
UNITED STATES PATENTS

| | | | |
|---|---|---|---|
| 3,662,186 | 5/1972 | Karklys | 307/141 |
| 3,840,752 | 10/1974 | Eshraghan | 307/141 |

Primary Examiner—David Smith, Jr.
Attorney, Agent, or Firm—Weingarten, Maxham & Schurgin

[57] ABSTRACT

An electronic timer switch adapted for installation in a standard switch receptacle and operative in response to applied AC power to provide a manually selectable operative duration. The timer switch is manually actuable to select an intended time interval and employs electronic circuitry for counting pulses derived from the input power frequency and to cause activation of a power switch during the selected interval. The switch can include indicators denoting selected and remaining time intervals and can include circuitry providing a warning indication of the approaching end of a selected interval.

6 Claims, 2 Drawing Figures

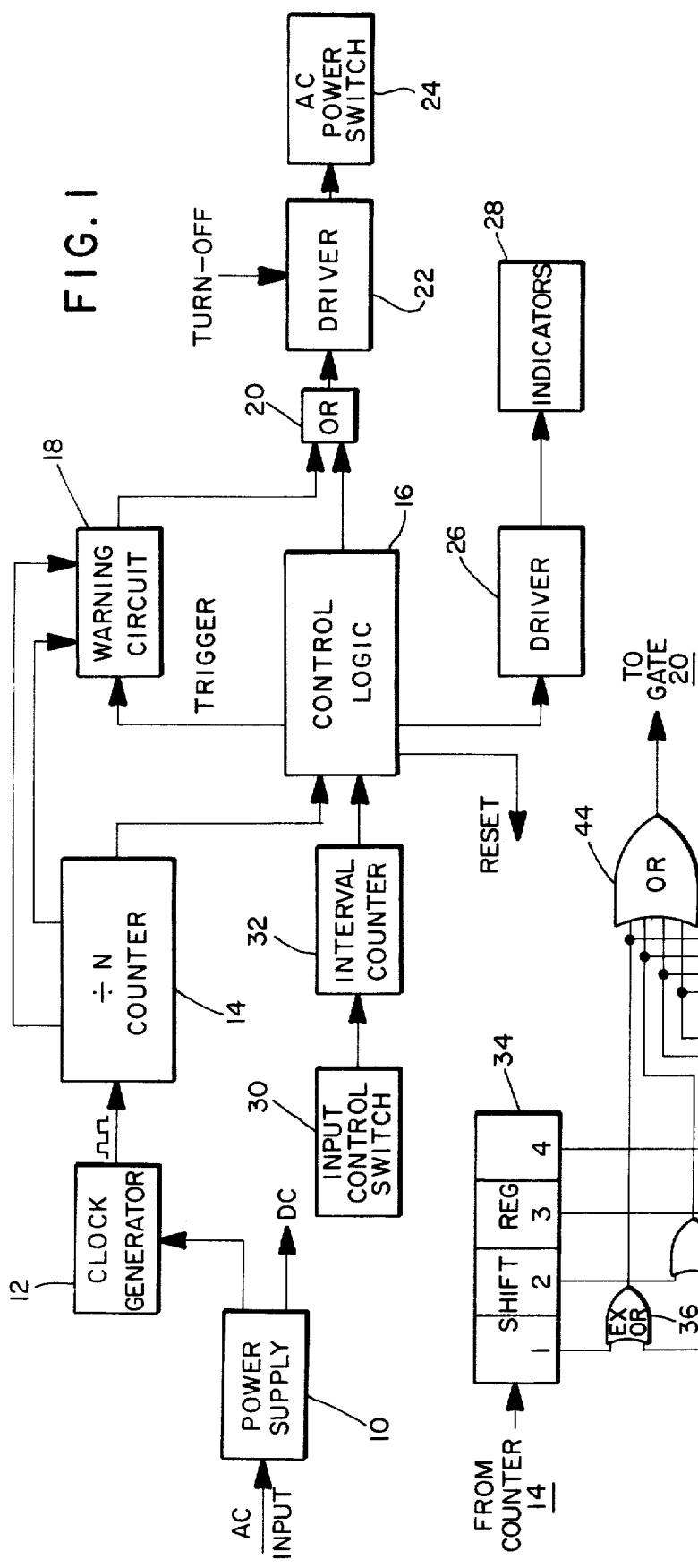

3,939,361

ELECTRONIC TIMER SWITCH

FIELD OF THE INVENTION

This invention relates to timer switches and more particularly to an electronic timer switch adapted for replacement of a standard power switch and selectively operative to provide different timing intervals.

BACKGROUND OF THE INVENTION

It is often useful to provide a timer switch operative for a selected interval of time after which an electrical switch is activated or deactivated as desired. Such timers of conventional construction usually employ clock or other mechanical or electromechanical mechanisms not usually implementable in a manner to suit many intended installation requirements. For example, it would often be desirable to install a timer switch in a standard switch outlet to convert a switch position in a home, office or other facility to one having a timing rather than merely an on-off capability.

SUMMARY OF THE INVENTION

According to the present invention, an electronic timer switch is provided of a form readily adapted for packaging in a unit mountable in a conventional switch receptacle and which is operative in response to AC input power to provide manually selectable operative intervals. The novel timer switch includes electronic circuitry for counting pulses derived from the input power frequency and for defining a manually selectable time interval. Decoding circuitry is employed to provide an output signal at the end of the selected interval to deactivate an AC power switch, typically an electronic switch. In typical implementation, the timer switch employs a predetermined operating interval which can be utilized singly or in multiples to provide an overall timing cycle. Intended timing is provided for example by a selected number of manual actuations of an input control, a single actuation providing a given time interval, two actuations providing twice this interval, etc. Circuitry can also be provided for indicating the selected and remaining time, and circuitry can also be included to provide a warning indication of the impending end of a timing cycle.

DESCRIPTION OF THE DRAWINGS

The invention will be more fully understood from the following detailed description taken in conjunction with the accompanying drawings in which:

FIG. 1 is a block diagram representation of a timer switch according to the invention; and FIG. 2 is a block diagram representation of the control logic and interval counter of the embodiment of FIG. 1.

DETAILED DESCRIPTION OF THE INVENTION

Referring to FIG. 1 there is shown a power supply circuit 10 which receives an AC input voltage, typically a standard 110 volt 60 Hertz input. The power supply provides a filtered and rectified DC voltage for energizing the timer switch circuitry, and also provides a rectified unfiltered signal to a clock generator 12 which provides a square wave signal at the 60 Hertz or other input frequency. The clock pulses can be derived otherwise, such as directly from the AC input or from the secondary of the power supply transformer prior to rectification. The clock pulses are applied to a divide by N counter 14 which has an output coupled to control logic 16 and two outputs coupled to a warning circuit 18. The outputs of control logic 16 and warning circuit 18 are coupled to an OR gate 20 the output of which is coupled to a driver circuit 22 which, in turn, is coupled to an AC power switch 24. The control logic 16 is also coupled to driver circuit 26 operative to energize indicators 28, and also provides a reset signal for resetting the circuitry at the end of a timing cycle. An input control switch 30 is coupled to an interval counter 32 the output of which is coupled to control logic 16.

The counting ratio of counter 14 is selected to provide an intended time interval which is employed itself or in multiples. For a one hour interval, N equals 216,000 which is the number of clock pulses counted over a 1 hour period at the end of which an output signal is provided by counter 14 to control logic 16. In the illustrated embodiment the timer is operative to provide timing intervals of up to 4 hours in 1 hour increments in accordance with the number of times the control switch 30 is actuated. It will be appreciated that the particular timing intervals can be selected to suit intended requirements.

In operation, the control switch 30 is actuated to select an intended timing interval which is stored by interval counter 32. Counter 14 accumulates counts representative of the number of received clock pulses from clock generator 12 and at the end of each hour, or other selected time, provides an output signal to control logic 16. The control logic also receives signals from counter 32 representing the intended timing interval and upon the end of which control logic 16 provides a signal via OR gate 20 to driver 22 which is operative to deactivate the power switch 24 which was activated upon the first actuation of the control switch 30. The power switch typically is a solid state switch and can be of any electrical, electronic or electromechanical form operative in response to a signal from driver 22. The power switch can also be of various switch configurations to suit user requirements. A turnoff signal can be provided to driver 22 to deactivate power switch 24 prior to the end of a timing cycle, and such signal can be manually provided by a separate control or by a distinguishable command derived by appropriate actuation of control switch 30. For example, actuation of control switch 30 beyond the timing capacity of the circuit can cause provision of the turnoff signal.

The invention can include one or more indicators to denote the selected time interval and which also can denote the time remaining in a particular timing cycle. The indicators 28 in the illustrated embodiment are typically light emitting diodes each energized by a signal from driver 26 to denote the time selected via control switch 30. In the illustrated embodiment, four indicators are provided, each illuminated in response to a corresponding actuation of control switch 30 to denote the selected time interval of 1, 2, 3 or 4 hours. At the end of each hour or other selected time during a timing cycle, one indicator can be extinguished to denote the remaining time within a one hour resolution.

The invention can also include a warning indication of the approaching termination of a timing cycle. As shown in the embodiment of FIG. 1, a warning circuit 18 receives a trigger signal from control logic 16 at the end of a selected timing interval and provides an output signal via OR gate 20 to driver 22 to continue activation of power switch 24 for a predetermined remaining interval of time. A warning indication can be provided by a momentary interruption in the energization of power switch 24 such as by momentary discontinuance of the output signal from warning circuit 18. Information defining the interruption time and the remaining time interval provided as control information for the warning circuit is derived from counter 14. Typically, a 1 second interruption is provided with the remaining time interval being several minutes. The momentary deactivation of power switch 24 provides an output indication of the approaching end of a timing cycle such as by blinking lights being controlled by the power switch. For some purposes it may be desirable to provide a separate warning indication rather than by interruption of energy controlling the power switch. It will be appreciated that the warning function is not needed in all instances in which case the invention can be implemented without this feature.

The control logic 16 and interval counter 32 are shown more particularly in FIG. 2. The control logic includes a multistage shift register 34, four stages being shown in the illustrated embodiment to accommodate a four hour timing cycle. The output from counter 14 is coupled to the input of shift register 34, and the output of each shift register stage is coupled to one input of a respective exclusive OR gate 36, 38, 40 and 42. The outputs from each gate 36 through 42 are coupled to an OR gate 44 the output of which is applied to OR gate 20 (FIG 1). The outputs of gates 36–42 are also coupled to driver 26 for actuation of respective indicators 28 such as light emitting diodes 29. The interval counter 32 includes a multistage shift register 46, also four stages in the illustrated embodiment, and the output of each stage being coupled to the other input of respective gates 36–42. Input signals for shift register 46 are provided by control switch 30.

To illustrate operation of the circuitry, assume that a one hour time interval is selected by single actuation of control switch 30. The first stage of counter 46 is set by the input signal from switch 30 and provides a signal which is coupled via gate 36 to gate 44 and thence via gate 20 to driver 22 for operation of power switch 24. The output signal from exclusive OR gate 36 also causes energization of the indicator 28 representing the selected 1 hour time interval. At the end of the 1 hour interval an output signal is provided by counter 14 to gate 36 to discontinue the gate output signal which in turn causes removal of the input signal to driver 22, causing deactivation of power switch 24. The discontinuance of the output signal from gate 36 also causes deactivation of the indicator 28.

For a selected two hour time interval, control switch 30 is actuated two times to cause setting of the first two stages of shift register 46. At the end of 1 hour, the output signal from gate 36 is discontinued but an output signal is still provided by gate 38 which is activated by a signal from the second shift register stage. Thus, an energizing signal is conveyed via gates 44 and 20 to driver 22 to continue the energization of the power switch until the end of the timing cycle. Operation of the circuit is similar for selection of other timing intervals. It will be appreciated that the indicator 28 associated with each timing increment is energized in response to the signal from the energized gates 36–42, and as each of these gates is deenergized upon discontinuance of the associated timing increment, the corresponding timing indicator is extinguished.

As described, a warning circuit can be provided to provide a remaining interval during which power switch 24 is actuated prior to deactivation. The warning circuit is triggered at the end of the selected timing cycle such as by discontinuance of the signal from gate 44 to commence a remaining interval.

The invention is typically implemented in microcircuit form and can be housed in a small package of a size and configuration adapted for mounting in a standard switch receptacle. The timer switch utilizes very little power for control of the operating circuitry and need only include two electrical terminals for attachment to a power source, for example, as a substitute for a conventional on-off switch. It will be appreciated that the invention can be implemented in various ways to suit specific requirements. For example, the invention can provide a timing interval in which power switch 24 is not active, and after which interval the switch is activated. It is not intended to limit the invention by what has been particularly shown and described except as indicated in the appended claims.

What is claimed is:

1. A timer switch adapted for electrical connection to an alternating current source and comprising:
   a manually actuable input control switch;
   first electronic circuit means operative in response to alternating current from said source to provide a count representative of the number of alternating current cycles received from a reference time, and including
      clock means operative to provide clock pulses in response to and at the frequency of said alternating current; and
      counter means operative in response to said clock pulses to provide a first signal upon receipt of a predetermined number thereof;
   control circuit means for providing a timing interval for duration selectable in successive discrete increments in response to the number of manual actuations of said control switch and including
      interval counter means operative in response to each actuation of said control switch to provide a second signal of duration corresponding to a discrete increment;
   second electronic circuit means operative in response to said first signal from said counter means and said second signal from said interval counter means to provide an output signal for the duration of said selected timing interval; and
   switch means operative in response to and for the duration of said output signal.

2. A timer switch according to claim 1 wherein said counter means includes:
   a multistage shift register;
   a plurality of first OR gates each having an output coupled to a respective stage of said shift register;
   second OR gate means having a plurality of inputs each coupled to the output of a respective one of said first OR gates and providing said first signal as an input therefrom;
   and wherein said interval counter means includes a multistage shift register having an output from each stage thereof coupled to an input of a respective one of said first OR gate means.

3. A timer switch according to claim 2 including at least one indicator means coupled to said first OR gates for denoting the timing interval selected.

4. A timer switch according to claim 3 wherein said at least one indicator means includes means for denoting the remaining extent of said selected timing interval.

5. A timer switch according to claim 2 including a plurality of indicator means each coupled to the output of respective ones of said OR gates and operative to denote the timing interval selected by means of said control switch and to denote the time remaining in a selected interval.

6. A timer switch according to claim 1 including circuit means coupled to said counter means and operative to provide an output indication of the impending end of said selected timing interval.

* * * * *

UNITED STATES PATENT OFFICE
CERTIFICATE OF CORRECTION

PATENT NO. : 3,939,361
DATED : February 17, 1976
INVENTOR(S) : Aidala et al

It is certified that error appears in the above-identified patent and that said Letters Patent are hereby corrected as shown below:

Column 2, line 41, change "turnfoff" to read -- turnoff --.

Column 4, line 56, change "output" to read -- input --.

Column 4, line 61, change "input" to read -- output --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*